United States Patent [19]

Steinrucken

[11] 4,257,133
[45] Mar. 24, 1981

[54] SOLAR EVAPORATOR BEEHIVE COVER

[76] Inventor: John D. Steinrucken, 219 Terry Pky., Terrytown, La. 70053

[21] Appl. No.: 932,047

[22] Filed: Aug. 7, 1978

[51] Int. Cl.³ .............................................. A01K 47/06
[52] U.S. Cl. ............................................................ 6/1
[58] Field of Search ........................... 6/1, 2 R; 229/22

[56] References Cited

U.S. PATENT DOCUMENTS

| | | | |
|---|---|---|---|
| 3,646 | 7/1844 | Fulkerson | 6/1 |
| 1,122,697 | 12/1914 | Danzenbaker | 6/1 |
| 2,274,090 | 2/1942 | Olson | 6/2 R |
| 2,498,880 | 2/1950 | Diehnelt | 6/1 |
| 2,522,511 | 9/1950 | Hageman | 6/1 |
| 2,709,820 | 6/1955 | Wahl | 6/1 |
| 3,485,202 | 12/1969 | Platt | 229/22 X |

FOREIGN PATENT DOCUMENTS

| | | | |
|---|---|---|---|
| 924278 | 7/1947 | France | 229/22 |
| 869884 | 6/1961 | United Kingdom | 6/1 |

*Primary Examiner*—Gene Mancene
*Assistant Examiner*—Robert P. Swiatek
*Attorney, Agent, or Firm*—Cushman, Darby & Cushman

[57] ABSTRACT

The invention relates to an improved beehive cover which dramatically enhances the production of larger quantities of honey. The improved cover improves air circulation within and around the honeycomb area thereby increasing the moisture evaporation rate in the hive and accordingly increases the rate at which nectar is changed into a concentrated form.

7 Claims, 4 Drawing Figures

SOLAR EVAPORATOR BEEHIVE COVER

BACKGROUND OF THE INVENTION

The present invention relates to an improvement in beehive structures and particularly an improved outer top cover.

It is known in the art of beekeeping that many problems are encountered throughout the year and that some of these problems relate directly to temperatures within the hive. Accordingly, one critical factor is the amount of air which circulates in the hive since this is the only thing controlling moisture content within the hive.

Traditionally, the bees will create air circulation themselves through a process called fanning. Likewise, past attempts have been made at designing beehive structures that would help regulate ventilation of a hive during summer months in order to keep the hive relatively cool and at the same time to prevent undesirable condensation and collection of moisture within the hive during winter months. Examples of such prior known structures are found in U.S. Pat. Nos. Diehnelt, 2,498,880, Hageman 2,522,511, and Wahl 2,709,820. In each of these patents circulation of air within the hive is desired in order to provide sufficient ventilation for the hive to keep down undesirable collections of moisture therein but is not so great as would materially reduce the temperature within the hive. Thus, while these prior art devices want some degree of ventilation they do not want a lot.

One of the principal objects of the present invention, unlike these prior art devices, is to substantially increase air circulation within the beehive by the use of solar energy. Another primary object of the present invention is to substantially increase the quantity of honey that is producible per hive by hastening the process through which nectar, collected by the bees, is changed from a solution containing about 50% sugar to its concentrated condition where it constitutes substantially 85% sugar.

In order for a significant amount of evaporation to occur within the hive to cause a faster change in concentrations, there must be sufficient air circulation around the open honeycombs in which the nectar is initially placed by the bees. In most hives even those that have covers which allow for a certain amount of air circulation, circulation within the hive is created by thousands of bees positioned throughout the hive which fan their wings and thus produce circulation within and around the honeycomb structure. The fanning process is a 24 hour process during the primary honey period and quite naturally consumes a considerable amount of energy of the hive. It has been found that during this primary honey-flowing period, in certain high humidity climates, two of every three pounds of honey produced in the hive is consumed as a food source by the bees engaged in the fanning or evaporation process. Likewise, the bees engaged in fanning are not available to leave the hive to join in the nectar-gathering process.

SUMMARY OF THE PRESENT INVENTION

The beehive cover as described herein is a unique device for substantially increasing air circulation within a beehive through the use of solar energy and thereby simultaneously increasing the output of honey from that hive.

The cover is of a lightweight construction, preferably made from one piece, and is comprised of four triangular-shaped sections which are folded or connected together to form a pyramid-shaped structure. The pyramid-shaped structure will sit atop a standard beehive replacing a standard outer cover and is provided with a plurality of air vents located adjacent the apex of the resulting pyramid. At the base of the pyramid, and on all four sides thereof, a depending flap structure depends from each side and overlaps the outside of the beehive in order to maintain the cover in its proper position. By painting the pyramid's outer surface a dark color, such as black or a dark green, the efficiency of the cover is greatly improved. The short waves of the sun are readily absorbed by the dark outer surface and the heat collected thereby is reradiated within the chamber defined beneath the outer cover. That heat causes the air under the cover to expand and, being lighter than the outside air, rise through the vents near the top of the pyramid. The exiting of this air pulls cooler air into the hive through the main opening producing convectional air currents throughout the hive. The improved air circulation which occurs throughout the hive due to the use of the improved cover referred to herein, not only reduces hive temperatures from that which exists when standard covers are used by about 4 to 6 degrees depending upon the type of standard cover used, but also allows a large number of bees that would otherwise be engaged in the fanning process to reduce hive temperatures to leave the hive and join in the nectar collection process or be available for other tasks within the hive. When the present improved cover has been used it has been noticed that fewer bees remain out of the hive than was the case with hives employing standard flat covers. It is believed that this reflects the reduced interior temperatures within the hive using the present improved cover.

These and other objects of the present invention will become clear and will be more fully understood when viewed in conjunction with the following drawings in which.

Figure 1:
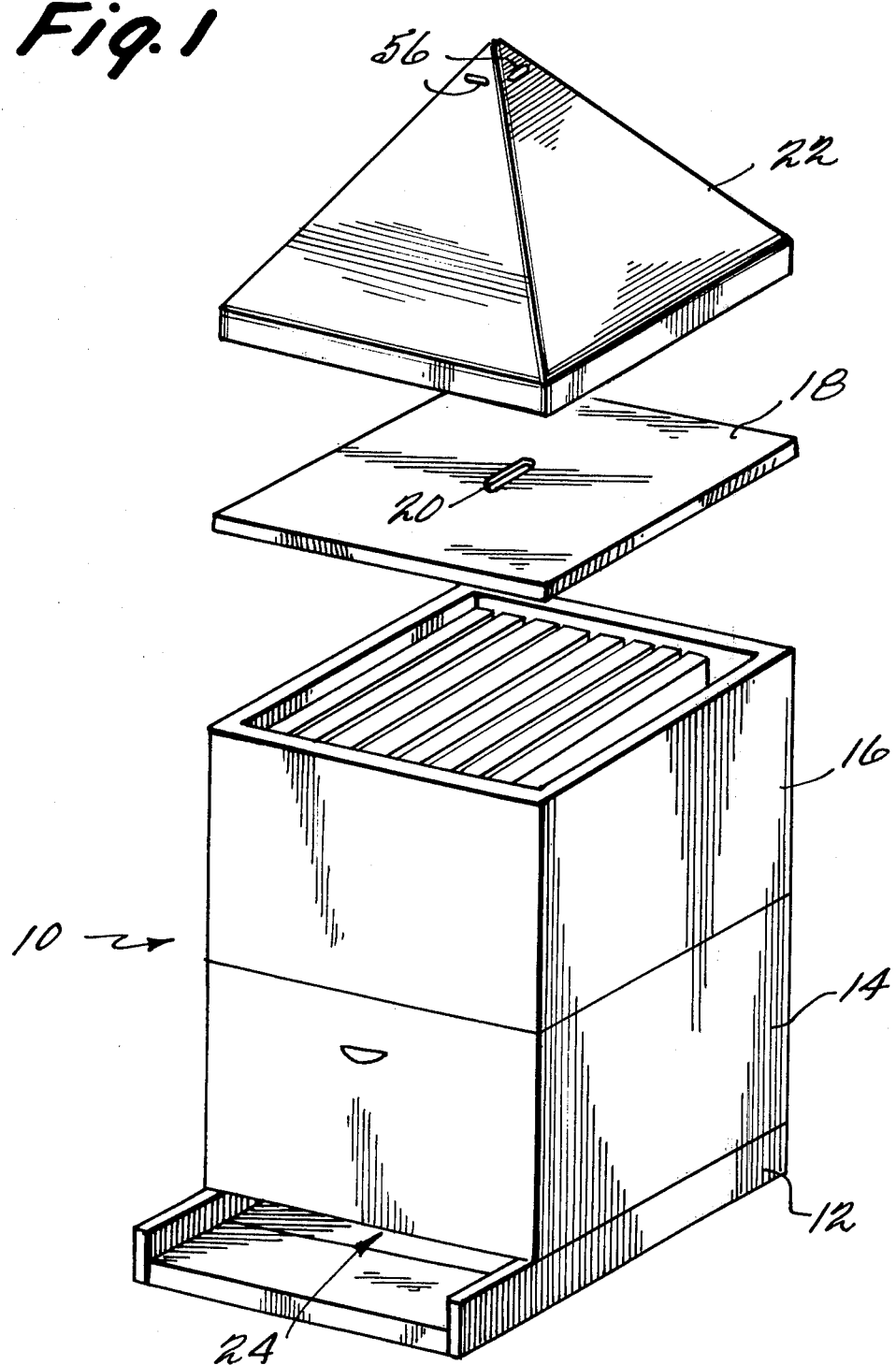
FIG. 1 shows a partially exploded perspective view of a beehive according to the present invention.

Turning now to FIG. 1, a standard beehive is set forth generally indicated by reference numeral 10 which includes a bottom section 12, a brood section 14, a super or honeycomb structure 16, and an inner cover 18 having at least one aperture 20 therein. The improved outer cover according to the present invention is designated by numeral 22. As is conventional, the bottom section 12 is provided with a front opening generally indicated by numeral 24.

Figure 2:
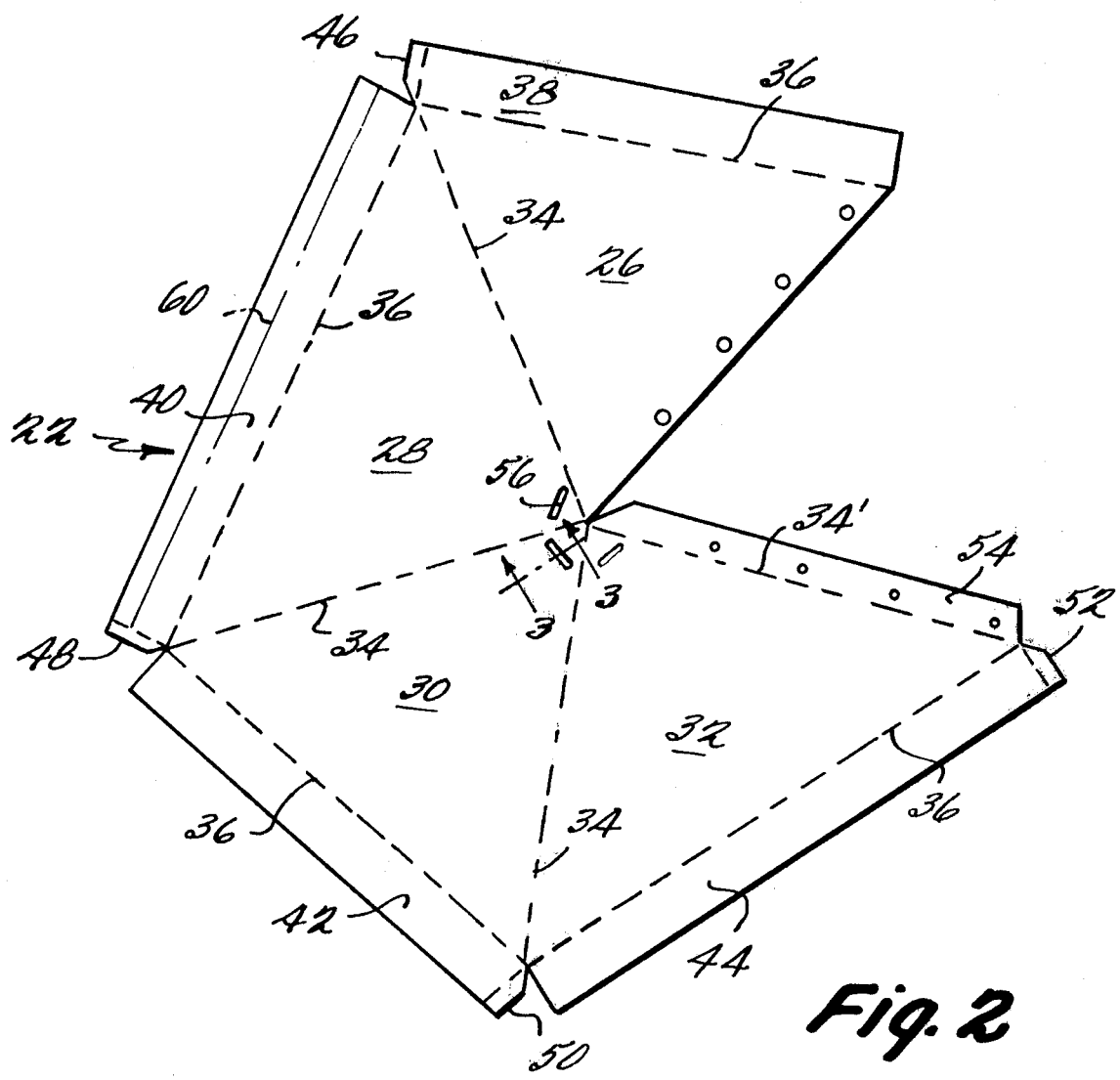
FIG. 2 is a top plan view of the improved beehive cover according to the present invention in an unfolded or flat condition.

The cover 22 in FIG. 1 is shown in its folded or constructed condition and that same cover is shown in FIG. 2 in its unfolded or flattened condition. Turning to FIG. 2, the cover 22 is comprised of four triangular-shaped sections 26-32. The structure shown in FIG. 2 is a one-piece structure with score lines 34 serving to define the side edges of triangular elements 26-32. It should also be understood that it is possible to construct the outer cover 22 from individual triangular elements having a shape similar to that shown for elements 26–32 and that instead of score lines as indicated at 34 each of the elements would have two separate edges which could be joined together by any convenient means depending upon the material from which the outer cover was being constructed. Preferably, sheet metal having a gauge of about 30 is the material from which the covers can be made although it should be understood that the covers can likewise be constructed from aluminum, thermoplastic materials or even from tar impregnated felt paper or from felt board. Turning again to FIG. 2, each of the elements 26–32 includes a base side which in this instance is defined by score line 36 and depending therefrom are overhang flaps 38–44. To ease construction, it is also preferred that each of the overhang flaps 38–44 include, at least on one end thereof, a corner tab indicated by numerals 46–52. Further, a securing strap 54 extends along the exposed side of element 32 and is defined by score line 34'.

In order to provide air vents within cover 22 a plurality of vents 56 are provided adjacent the apex of cover 22 and preferably as close as possible to the pointed top. By positioning vents 56 in this manner a fairly substantial expansion chamber is created beneath cover 22 and above inner cover 18. By providing a dark and preferably black outer surface on cover 22 the short waves of the sun will be absorbed during daylight hours. As a result long waves are reradiated as heat within that chamber which heats the air therein. As the heated air expands and becomes lighter than outside air, it will rise and exit through vents 56. The air exiting vents 56 will cause fresh air to be drawn in the bottom of the hive through the main hive opening 24 so that a convection current is created within hive 10. Depending upon the size and number of vent holes 56 and cover 22 as well as the holes within inner cover 18, the air circulation within hive 10 can be substantial.

As indicated hereinbefore, it is preferred that cover 22 be made from a single piece of sheet metal and that it be cut and folded along the lines as indicated in FIG. 2 into a pyramid-shaped structure with the two free sides of elements 26 and 32 being connected by securing strap 54. Securing strap 54 can be connected to element 26 by sheet metal screws, rivets, spot welds or by any other convenient means. If other materials are used any other suitable fastening technique which will serve to connect together that material will be sufficient for the purposes herein.

Figure 3:
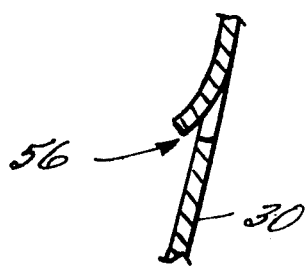
FIG. 3 is a view taken along line 3—3 in FIG. 2 and shows in diagrammatic fashion a cross section of the vents located near the apex of the cover.

As an example of a typical cover and with the understanding that most beehives are rectangular structures the sides of elements 26–32 could be approximately 15 inches long with a base of elements 28 and 32 being about 20 inches in length, so as to correspond with the long side of the hive, while the length of the bases of elements 26 and 30 would preferably be about 16 inches in length, or as long as is necessary to correspond to the width of the hive. Overhanging flaps 38–44 are preferably about 2 inches in height with the corner tabs being about ½ inch in width. Securing strap 54 is preferably about an inch wide so that only a minimum amount of element 26 would be overlapped thereby. Vents 56 are preferably horizontal slits positioned about 2 inches below the apex and as shown in FIG. 3 the upper part of the cut portion forming vent 56 is bent outwardly while the lower part of the vent area is bent inwardly thereby producing an opening about an inch long and one half an inch wide. Thus, rain falling on cover 22 will be deflected away from vent 56 by the upper portion thereof and will not enter the hive.

By using the present invention it has been found that the production of honey can be increased by about 20% as compared with the same hive using a conventional cover. Likewise, to improve the efficiency of this cover and to ensure proper air flow it is helpful to seal the area between overhang flaps 38–44 and the hive body 10. A strip of foam rubber 60, shown in phantom in FIG. 2, can be secured to the inside surface of overhang flaps 38–44 for this purpose following the folding of the one-piece structure into the pyramid cover 22.

Figure 4:
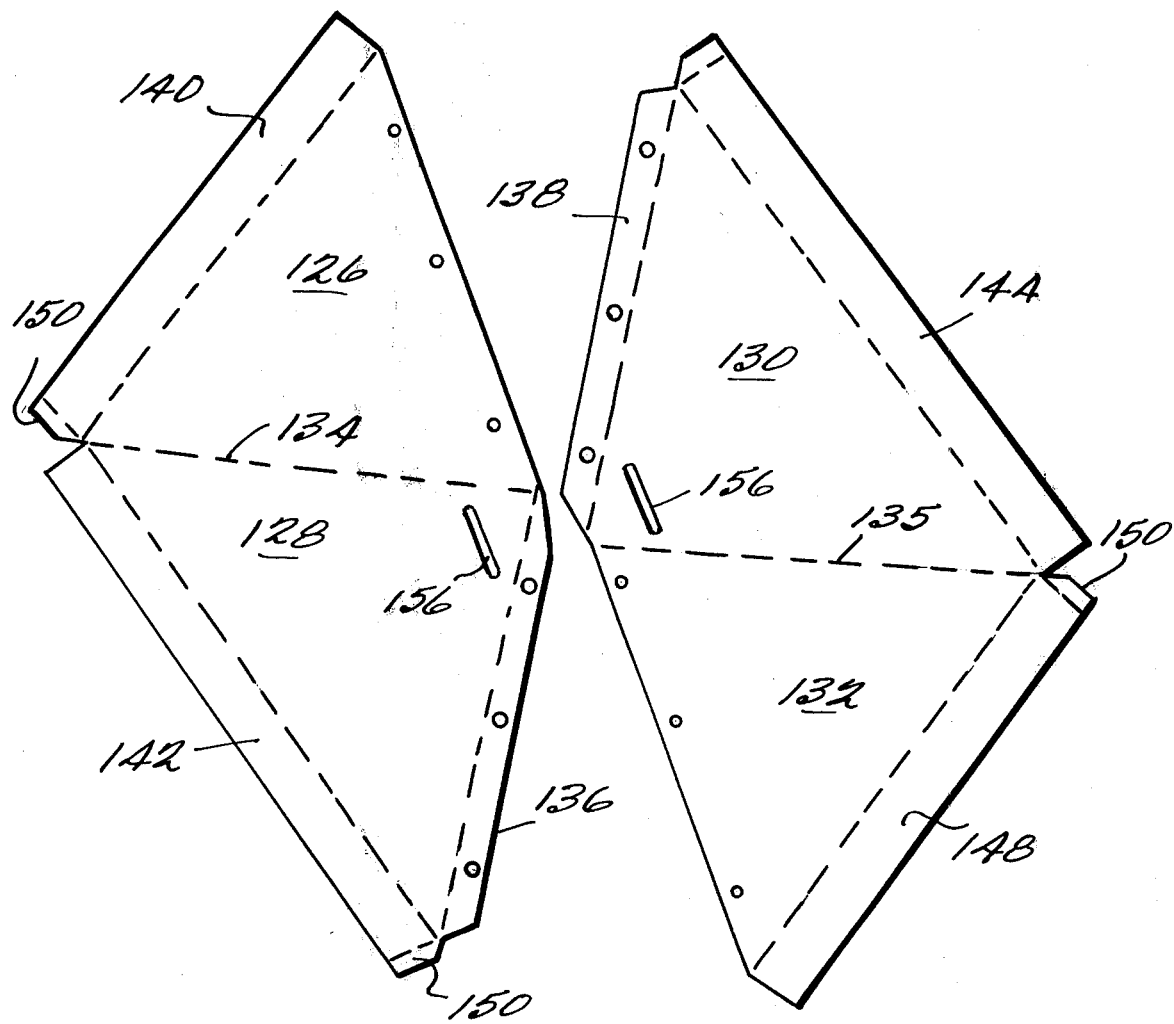
FIG. 4 shows another embodiment of an improved beehive cover according to the present invention.

Turning now to FIG. 4 which shows a second embodiment in the form of a two-piece structure for forming the hive cover. This structure is similar to that shown in FIG. 2 except that it is formed from two pieces and is comprised of triangular-shaped elements 126, 128, 130 and 132. A score or fold line 134 exists between elements 126 and 128 and serves to define one side of each of these two elements. In a similar manner a fold or score line 135 lies between elements 130 and 132 and defines one side of each of those elements. While the other side of elements 126 and 132 are straight sides, the free sides of elements 128 and 130 each respectively have a securing strap indicated respectively by numerals 136 and 138. Strap 136 will overlap the free side of element 132 whereas securing strap 138 will overlap the free side of element 126 when the two pieces are formed together into a completed cover. Each of the elements 126–132 is again provided with an overhanging flap indicated respectively by numerals 140–148 and also each of the overhanging flaps has a corner tab indicated by numeral 150. As was the case in the embodiment shown in FIG. 2, air vents are also provided near the apex of the cover, these vents being indicated in FIG. 4 by numeral 156. The vents are approximately 2 inches in length and are positioned as closely as possible to the apex of sections 128 and 130 as shown.

In both the embodiments when the cover is constructed, it may be necessary to use conventional sealing compounds to seal any seams to assure that the cover itself is water-tight and will not leak thereby assuring that moisture does not enter the hive.

While the invention has been described in connection with what is presently conceived to be the most practical and preferred embodiment, it is to be understood that the invention is not to be limited to the disclosed embodiment but on the contrary, is intended to cover various modifications and equivalent arrangements included within the spirit and scope of the appended claims, which scope is to be accorded the broadest interpretation of such claims so as to encompass all such equivalent structures.

What I claim is:

1. A beehive evaporation enhancing cover comprised of four triangular-shaped primary elements each having two side edges and a base edge, said elements being connected together along their side edges to form a one-piece structure so that an open V-shaped area is formed within the one-piece structure, the V-shaped area being defined by two unattached sides of two opposing elements, a securing strap extending from and running along one of the unattached sides defining the V-shaped area, each element having an overhang flap depending from and extending along the base edge, a plurality of the elements having means defining a ventilation opening for ventilating the hive, said opening positioned between the sides of said element and adjacent the apex thereof.

2. A beehive cover as in claim 1 wherein the cover is comprised of sheet metal.

3. A beehive cover as in claim 2 wherein the sheet metal material has a gauge of about 30.

4. A beehive cover as in claim 1 wherein the cover is comprised of aluminum.

5. A beehive cover as in claim 1 wherein the cover is constructed from a single piece of material.

6. A beehive cover as in claim 1 wherein the cover is comprised of tar impregnated felt paper.

7. A beehive cover as in claim 1 wherein the cover is constructed from a plurality of separate elements connected together to form said one-piece structure.

* * * * *